Aug. 15, 1967    E. W. LUNDAHL    3,336,575
SIGNAL DEVICE FOR A VEHICLE
Filed Nov. 9, 1964

Inventor
Ernest W. Lundahl
By Anderson, Luedeka, Fitch, Even & Tabin
Atty's

United States Patent Office 3,336,575
Patented Aug. 15, 1967

3,336,575
SIGNAL DEVICE FOR A VEHICLE
Ernest W. Lundahl, P.O. Box 2525,
Idaho Falls, Idaho 83401
Filed Nov. 9, 1964, Ser. No. 409,763
3 Claims. (Cl. 340—72)

The present invention relates generally to vehicle signaling devices. More particularly, the invention is directed to an improved vehicle signaling device which advises pedestrians and other drivers that the right-of-way is being relinquished.

A variety of automobile signal devices have been proposed in an attempt to provide improved and faster visual communication between the driver of a vehicle and other drivers and pedestrians. Unfortunately, such prior signal devices were often capable of misleading other drivers, especially those systems which included no means for automatically deactivating the system.

Thus, signaling systems have been proposed which utilize blinking lights to advise other persons in the vicinity of a particular intention of the driver. However, these systems are not capable of also advising such other persons if the driver subsequently commences to take a course of action contrary to his evidenced intention, or if the driver subsequently resumes his former course of action but neglects to deactivate the signaling system.

More specifically, there exists no satisfactory signaling device for continuously advising others of the intention of the operator of a vehicle to stop his vehicle and thereby relinquish the right-of-way to other vehicles and to pedestrians, which signaling device also incorporates a safety feature to automatically deactivate the signal so as to prevent a misleading signal from being communicated through an inadvertence or oversight of the driver.

Accordingly, a principal object of the present invention is the provision of a novel and improved signaling device.

Another object of the present invention is to provide a novel and improved signaling device for a vehicle, which device incorporates an automatic safety feature to warn others of a dangerous situation.

Still another object of the present invention is to provide a simple and economical automobile signaling or advising device which is durable and dependable.

Other objects and advantages of the present invention will become more apparent from the following description and the associated drawings, wherein.

Figure 1:
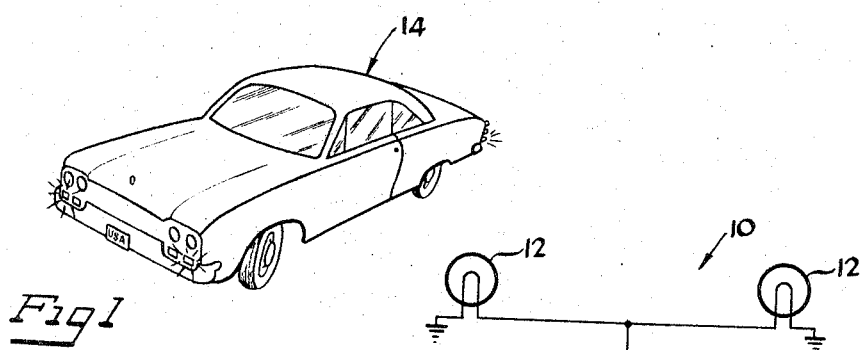
FIGURE 1 is a perspective view of an automobile incorporating a yield-signaling device showing various features of the invention.

Very briefly, the illustrated signal device or apparatus 10 includes signal lights 12 adapted to be mounted on a vehicle such as an automobile 14, and actuating means for manually selectively causing the lights 12 to blink continuously so as to advise pedestrians or the operators of nearby vehicles that the right-of-way is being yielded. The illustrated device 10 also includes a safety switch 18 which automatically halts the operation of the signal should the automobile 14 begin to accelerate, thereby preventing a misleading signal from being communicated to others in the vicinity as the driver proceeds and eliminating the need for the driver to deactivate the signal manually.

FIGURE 1 illustrates the automobile 14 which has four signaling or advising lights 12, one located at each corner of the automobile in the same general location as turn signals or courtesy lights are presently located. Thus, there are lights at the rear of the vehicle as well as at the front of the vehicle. The intention of the driver of the vehicle is thereby conveyed not only to those whom it is approaching, but to the drivers of vehicles following the automobile 14 in the stream of traffic.

Figure 2:
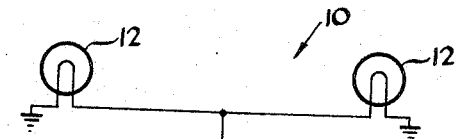
FIGURE 2 is a diagrammatic representation of the electrical circuit of the signaling device incorporated in the vehicle of FIGURE 1.

Now considering in further detail the signal device or apparatus 10, FIGURE 2 illustrates the circuit in which the four lights or light bulbs 12 are connected in parallel and are individually grounded, as by connection to the vehicle body. The four lights 12 are connected in series with an inside or indicator light 19 which may be located on the dashboard of the vehicle and is adapted to advise the driver that the system is activated. The light 19 is also grounded.

The lights 12 and 19 are caused to blink, i.e., operate intermittently, by means of a blinker switch 20 which is connected in series with the lights 12 and 19. Connected in series with the switch 20 is a hold contact or holding relay 22 and a power source or supply in the form of the battery 24 of the automobile, which battery is grounded in accordance with conventional practice. The illustrated holding relay 22 is normally open so as to provide a normally open circuit between the lights 12 and the power supply. The holding relay 22 includes a first contact 26, a second contact 28, a movable armature 30, and a coil 32. The first contact 26 is connected in series with the lights 12 through the blinker 20. The second contact 28 is connected to one side of a momentary contact or switch 34, with the other side of the switch being connected through a fuse 36 to the power supply 24. The movable armature 30 is connected between the momentary switch 34 and the power supply 24. The second contact 28 of the relay is also connected through a safety switch 18 to the coil 32 of the holding relay and the coil is in turn connected to ground.

The operation of the circuit may now be readily understood. To initiate the signal when the switch 18 is closed, the momentary contact or switch 34 is closed, causing current to flow from the battery 24 through the coil 32 of the holding relay 22 through ground and back to the battery. The flow of current through the coil 32 causes the holding relay 22 to close. Specifically, the movable armature 30 is brought into engagement with the two contacts 26 and 28. This, of course, establishes a first current path from the battery through the armature 30, the contact 26, the blinker 20, the lights 12 and 19 and back through ground to the battery. It also establishes a second current path from the battery, through the armature 30, the contact 28, the closed switch 18, the coil 32 and back through ground to the battery. The second path by-passes the momentary switch 34. Thus, even when the latter is open, there is a path for current through the coil 32, thus maintaining the holding relay 22 closed.

It will be noted that current is supplied to the lights 12 through the armature 30 and the first contact 26 from approximately the time the closing of the momentary contact or switch 34 causes current to flow through the coil 32 to bring the armature 30 into engagement with that contact 26. The blinker switch or means 20 operates in a usual or known manner to cause the lights 12 to blink or flash on and off, which is a much more visible and identifiable signal than a continuous light.

Should the safety switch 18 be opened, as will be explained, the flow of current through the coil 32 is interrupted, thereby automatically causing the holding relay to open and interrupting the flow of current to the lights 12 so as to cause the signal to cease.

The switch 18 is operated by the accelerator pedal of the automobile so that, when the switch 34 is closed and the system is operating, subsequent acceleration of the vehicle will open the switch and cause the operation of the system to cease. Thus, if a vehicle has halted at an intersection and the driver has signaled to another driver that he is relinquishing the right-of-way, the signal will cease when the signaling driver again proceeds. This will prevent drivers at subsequent intersections from being misled if the signaling driver does not realize that the system is still operating and does not intend to relinquish the right-of-way at such intersection. Further, the automatic deactivation of the signal eliminates the need for manual deactivation by the driver, thus permitting him to devote all of his attentions to the road.

Figure 3:
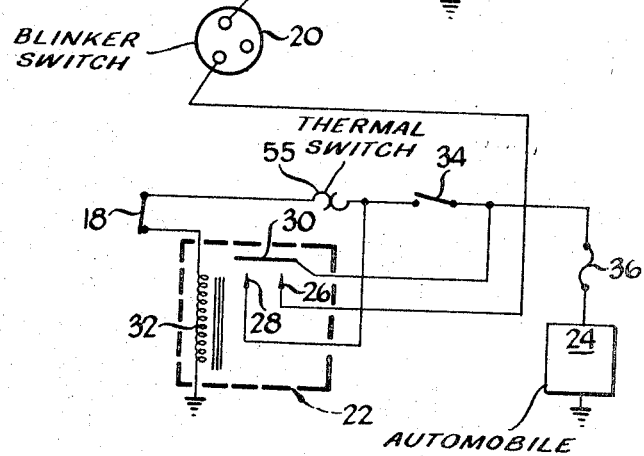
FIGURE 3 is a diagrammatic side representation of a portion of the illustrated vehicle and signaling device, including an accelerator pedal, a gas linkage arm, and a switch of the signaling device.

Referring more specifically now to the switch arrangement 18, and with particular reference to FIGURE 3, the switch 18 is in the form of a microswitch which includes a housing 38 on the lower wall of which is mounted a contact button 40. An actuating arm 42 is pivotally mounted adjacent one of its ends on the lower wall of the housing 38 in spaced relation to the button 40 and is positioned so as to engage the button 40. The opposite end of the arm is provided with a roller 44. Upward pressure on the roller 44 is effective to depress the contact button 40 and close the switch.

The housing 38 is preferably mounted on a stationary portion of the vehicle, preferably a portion of the motor thereof, adjacent to a throttle lever 48. The lever 48 is mounted for pivotal movement about at one of its ends on a shaft 49 extending to the vehicle carburetor (not shown). The opposite end of the lever is connected through a linkage arrangement, not shown but represented by the line 50, to a rod 52 projecting from the accelerator pedal 54 of the vehicle. The upper edge of the lever 48 is engaged by the roller 44 of the switch arm 42 intermediate its ends.

When the vehicle is at a standstill, as at a traffic light or intersection, the lever 48 is in its highest position and maintains the switch 18 in a closed condition. Thus, if the switch 34 were to be closed, the signal lights 12 and indicator light 19 would operate. However, when the accelerator pedal 54 is depressed, the lever 48 is pivoted downwardly, thus permitting the actuating arm 42 to be pivoted downwardly and the contact button 40 to be released, thereby opening the switch 18.

It will be appreciated that the signal system can be activated whenever the vehicle accelerator pedal is not depressed as, for example, when the vehicle is coasting or when it is at a standstill and the motor idling. However, when the accelerator is depressed so that the vehicle is being driven, the signal system cannot be activated or, if activated, will be deactivated.

Thus, it may be seen that a safety feature is incorporated into the illustrated signal device 10 in that the depression of the accelerator pedal 54, i.e., the acceleration of the automobile automatically results in the switch 18 being opened so as to immediately deactivate the system. This safety feature comes into effect whenever the operator of the automobile depresses the gas pedal, whether it be inadvertently, as a result of a change of intention of the driver, or merely because the driver has chosen to proceed after the vehicle signaled to has passed. Further, the illustrated signal device 10 is simple, economical, durable and dependable.

In addition to the aforementioned switch 18, the flow of current to the lights 12 and 19 will also be interrupted through the operation of a thermal switch 55 which is suitably connected in the circuit in series with the coil 32. The switch 55 preferably opens after the lights have blinked for a predetermined time interval of perhaps a minute, thereby providing a safety feature by preventing the signal from continuing indefinitely and misleading persons in the vicinity if, for some reason, the switch 18 fails to operate properly.

Figure 4:
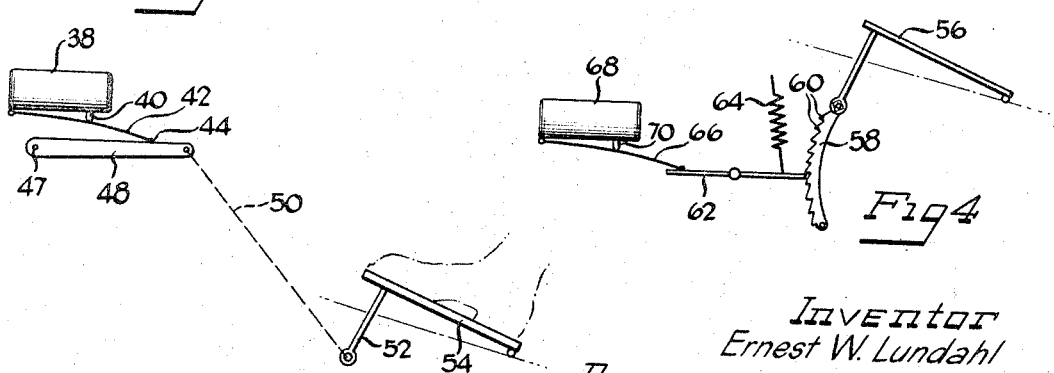
FIGURE 4 is a view similar to that of FIGURE 3, but showing an alternate form of construction.

An alternate connection of the safety switch 18 to the accelerator pedal of the vehicle is shown in FIGURE 4. In the alternate arrangement, an accelerator pedal 56 has connected thereto a ratchet 58 in the form of a curved strip formed to provide a plurality of teeth 60 along one edge. Positioned adjacent the ratchet 58 is a lever arm 62 which is pivoted intermediate its ends. The lever arm is disposed so that one of its ends is engaged by the teeth 60 of the ratchet when the ratchet is moved downwardly, thereby rocking the lever in a counterclockwise direction. The lever is biased for rotation in a clockwise direction by a spring 64.

The opposite end of the lever arm 62, i.e., the end opposite that engaged by the ratchet 58, is positioned so as to engage and move the actuating arm 66 of a normally closed microswitch 68 when the lever is rocked in a counterclockwise direction, as by downward movement of the ratchet. This movement of the actuating arm causes a contact button 70 of the microswitch 68 to be depressed, thereby opening the switch 18.

The above-described arrangement is advantageous in that it renders the signal system operable even when the accelerator pedal is partially depressed and is effective to deactivate the system by a further depression of the pedal rather than merely an initial depression. Thus, the signal system can be used, among other things, to invite trailing cars to pass on highways and expressways, and to invite merging traffic to enter a highway or expressway.

Various modifications and changes may be made in the illustrated structure without departing from the spirit and scope of the present invention.

Various features of the present invention are set forth in the following claims.

What is claimed is:

1. A signal device for a vehicle that is powered by an internal combustion gasoline engine and caused to accelerate by depressing a gas pedal located in the operator's compartment, said device being operable to advise pedestrians and other drivers that the operator of the vehicle will yield the right-of-way to said pedestrians and drivers, said signal device comprising at least one signal light that is adapted to be supported on the vehicle so as to be visible externally of the vehicle, a battery to provide electricity to the light, said battery being adapted to be supported on the vehicle, means defining an electrical circuit that connects said light with said battery, said circuit including a normally-open momentary actuating switch, a normally-closed safety switch, and a holding relay, said holding relay including a first contact, a second contact, an armature movable into and out of engagement with said contacts, and a coil operable when energized to move said armature into such engagement, said first contact being connected to said light and said armature being connected to said battery, said battery also being connected to said coil through said actuating switch, said second contact being connected through said safety switch to said coil, and means adapted to be supported on the vehicle and to be moved by the depression of the gas pedal of the vehicle to automatically open said safety switch when the vehicle is thus accelerated.

2. A signal device for a vehicle that is powered by an internal combustion gasoline engine and caused to accelerate by depressing a gas pedal located in the operator's compartment, said device being operable to advise pedestrians and other drivers that the operator of the vehicle will yield the right-of-way to said pedestrians and drivers, said signal device comprising four signal lights which are each adapted to be supported generally at one corner of the vehicle, a battery to provide electricity to the lights, said battery being adapted to be supported on the vehicle, means defining an electrical circuit that connects said four lights in parallel with regard to one another and in series with regard to said battery, said circuit including a momentary actuating switch, a safety switch, and a holding relay, said holding relay including a first contact, a second contact, an armature movable into and out of engagement with said contacts, and a coil, said first contact being connected to said lights and said armature being connected to said battery, said battery being connected to said coil of said holding relay through said actuating switch, said second contact being connected to said coil, said safety switch being positioned between said second contact and said coil, and means adapted to be supported on the vehicle and to be moved by the depression of the gas pedal of the vehicle to automatically open said safety switch when the vehicle is thus accelerated.

3. A signal device for a vehicle powered by an engine caused to accelerate by depressing an acceleration pedal located in the operator's compartment, said signal device comprising at least one signal light adapted to be supported on the vehicle so as to be visible externally of the vehicle, an electrical current source supported on said vehicle, an electrical circuit connecting said signal light with said current source, said circuit including a normally-open momentary switch, manually operable means for closing said switch, a relay circuit including a relay coil connected in series with said switch and said current source whereby said relay coil is energized by closure of said switch, and a normally open relay contact in parallel with said momentary switch, a normally-closed safety switch electrically connected within said relay circuit and effective when opened to deenergized said relay coil, and means connecting said safety switch to the accelerator pedal of the vehicle to automatically open said safety switch when the accelerator pedal is depressed.

References Cited
UNITED STATES PATENTS 2,800,545  7/1957  Pellegrino _____ 340—71 X NEIL C. READ, *Primary Examiner.*

A. H. WARING, *Assistant Examiner.*